United States Patent [19]

Ogino

[11] Patent Number: 4,969,143
[45] Date of Patent: Nov. 6, 1990

[54] INFORMATION RECORDING MEDIUM INCLUDING A SPACING MEMBER HAVING PORTIONS ALIGNED WITH AND BONDED TO PREFORMATTED DATA RECORDING AREAS

[75] Inventor: Noboru Ogino, Machida, Japan

[73] Assignee: Kabushiki Kaisha Toshiba, Kanagawa, Japan

[21] Appl. No.: 144,340

[22] Filed: Jan. 15, 1988

[30] Foreign Application Priority Data

Jan. 31, 1987 [JP] Japan .................................. 62-21090

[51] Int. Cl.$^5$ .............................................. G11B 7/24
[52] U.S. Cl. ................................. 369/275.5; 369/272; 346/135.1
[58] Field of Search ............... 369/275, 284, 286, 288, 369/109, 100, 275.5, 272; 346/135.1, 137, 76 L

[56] References Cited

U.S. PATENT DOCUMENTS

| | | | |
|---|---|---|---|
| 4,074,282 | 2/1978 | Balas, Jr. et al. | 346/135 |
| 4,432,002 | 2/1984 | Ando | 346/76 L |
| 4,443,806 | 4/1984 | Ando | 346/135.1 |
| 4,443,870 | 4/1984 | Hazel et al. | 369/275 |
| 4,564,850 | 1/1986 | Kazuhara | 346/137 |
| 4,683,562 | 7/1987 | Matsui et al. | 369/284 |

Primary Examiner—Aristotelis M. Psitos
Assistant Examiner—Hoa T. Nguyen
Attorney, Agent, or Firm—Finnegan, Henderson, Farabow, Garrett, and Dunner

[57] ABSTRACT

An information recording medium is disclosed including a first disc having opposite side surfaces and a second disc having opposite side surfaces, coaxially positioned adjacent the first disc. A first spacing member is positioned between the first and second discs for fixedly connecting the first and second discs together to form an air space between the facing surfaces of the first and second discs. A recording layer is formed on a facing surface of one of the first and second discs in the air space between the discs. The recording layer includes a pre-formatted data recording area having recorded pre-formatted data thereon. A second spacing member is aligned with the surface of the pre-formatted data recording area for bonding the pre-formatted data recording area of the recording layer to the facing surface of the other of the first and second discs.

10 Claims, 3 Drawing Sheets

INFORMATION RECORDING MEDIUM INCLUDING A SPACING MEMBER HAVING PORTIONS ALIGNED WITH AND BONDED TO PREFORMATTED DATA RECORDING AREAS

BACKGROUND OF THE INVENTION

1. Field of the Invention

The present invention relates to an information recording medium, such as an optical disc or video disc, on which high-density recording can be performed.

2. Discussion of Background

One conventional information recording medium employing an "air-sandwich" construction is disclosed in U.S. Pat. No. 4,074,282 issued to Balas, Jr. et al. This recording medium consists of two discs, each of which may be formed of a transparent plastic plate. Optical information recording layers, which consist of an energy-absorbing layer or a light reflective layer, are formed directly on one surface of each disc. The discs face each other so that the recording layers are positioned therebetween. Each of the discs is bonded with adhesive agent to a concentric inner spacer and a concentric outer spacer disposed therebetween to provide an air space between the discs.

The discs of the above conventional information recording medium must be formed with a relatively small thickness, since the recording/reading beam must pass through the discs without distortion. That is, the use of a disc having small thickness prevents beam energy losses and refraction of light as the beam passes through the disc. However, due to the disc's thickness and transparency requirements, the material used lacks stiffness. Thus, when the air or gas within the space between the discs expands or contracts as the surrounding heat or atmospheric pressure changes, the information recording medium bends or undulates in accordance with this expansion or contraction. Any resulting bending or undulation then causes defocusing of the recording/reading beam, which produces inaccuracies in processing the information stored on the recording layers. In extreme cases, the information recording medium and the optical head will eventually contact each other thereby preventing any processing of the stored information.

To overcome the prior art disadvantages mentioned above, an improved information recording medium was developed, as disclosed in U.S. Pat. No. 4,564,850 issued to Odawara. This improved information recording medium has a first disc and a second disc coaxially positioned adjacent the first disc to reinforce the first disc. A first spacer is positioned between the first and second discs for fixedly connecting the discs together and for forming an air space between the discs. A recording layer is formed on one surface of the first or second discs within the air space. A second spacer is radially displaced from the first spacer, and positioned between the first and second discs. This second spacer enables the discs to move relative to each other in a radial direction in response to expansion or contraction of at least one of the discs due to changes in temperature, humidity, atmospheric pressure. etc.

Therefore, the information recording medium mentioned above will not bend or undulate due to changes in temperature and atmospheric pressure.

However, in the latter case, other difficulties arise. That is, the information recording medium becomes unduly thick, since the air space is formed between the recording layer and the first or second disc along the whole surface thereof. Further, since the bonding area of the first and second spacers for fixedly connecting with the first and second discs is relatively small, the first and second discs tend to peel from the spacers.

SUMMARY OF THE INVENTION

It is an object of the present invention to provide an information recording medium which has improved bonding strength for securely connecting spacers and discs, and improved durability.

According to one aspect of the present invention, there is provided an information recording medium comprising a first disc member having opposite side surfaces; a second disc member including opposite side surfaces, coaxially positioned adjacent the first disc member; a first spacing member between the first and second disc members for fixedly connecting the disc members together to form an air space between the facing surfaces of the disc members; a recording layer formed on a facing surface of one of the first and second disc members in the air space between the disc members, the recording layer including a pre-formatted data recording area having recorded pre-formatted data thereon: and a second spacing member aligned with the surface of the pre-formatted data recording area for bonding the pre-formatted data recording area of the recording layer to the members.

It is preferred that the first spacing member includes an annular inner spacer and an annular outer spacer bonded between the first and second disc members.

It is also preferred that also including means for bonding the second spacing member to the inner spacer and the outer spacer.

BRIEF DESCRIPTION OF THE DRAWINGS

These and other objects and advantages of this invention will become more apparent and more readily appreciated from the following detailed description of the presently preferred exemplary embodiments, taken in conjunction with the accompanying drawing of which.

DETAILED DESCRIPTION OF THE PREFERRED EMBODIMENTS

The following is a detailed description of an embodiment of the present invention with reference to the draWings.

Figure 2:
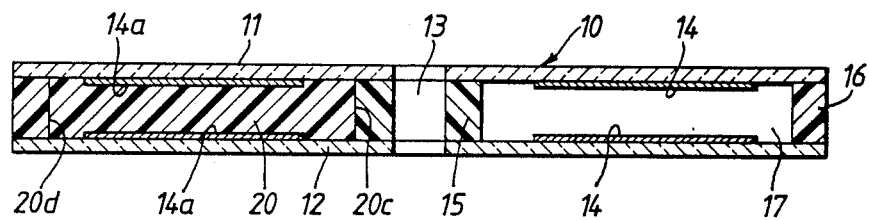
FIG. 2 is a vertical sectional view of the information according medium shown in FIG. 1.
Figure 3:
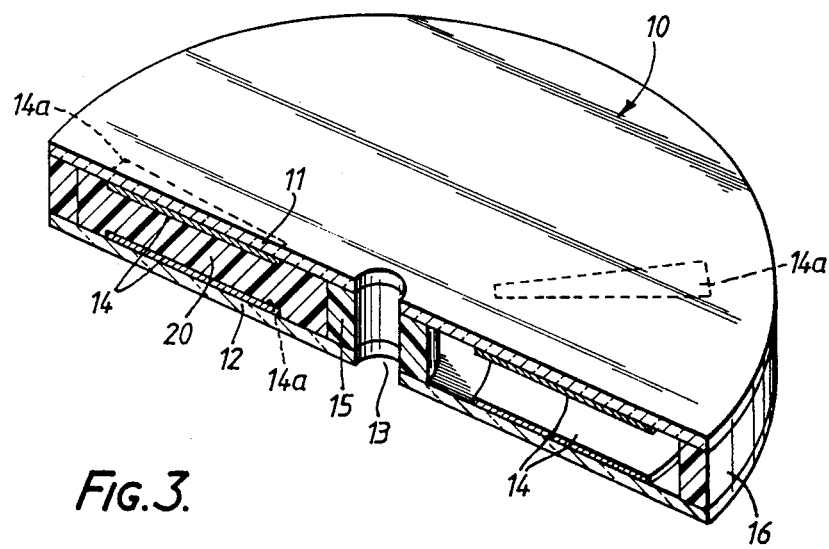
FIG. 3 is a fragmentary perspective view of the information recording medium shown in FIG. 2.

FIGS. 2 and 3 show an optical disc which is an information recording medium of the present invention. This optical disc 10 is constructed using a first disc 11 and a second disc 12 composed of transparent material of synthetic resin, for example, polycarbonate resin. First and second discs 11 and 12 are formed with, for example, external diameters of approximately 130 mm (5.25 inches) and spindle holes 13 of diameter approximately 15 mm drilled at their centers of rotation. Discs 11 and 12 are respectively formed with thicknesses of 1-2 mm.

Figure 4:
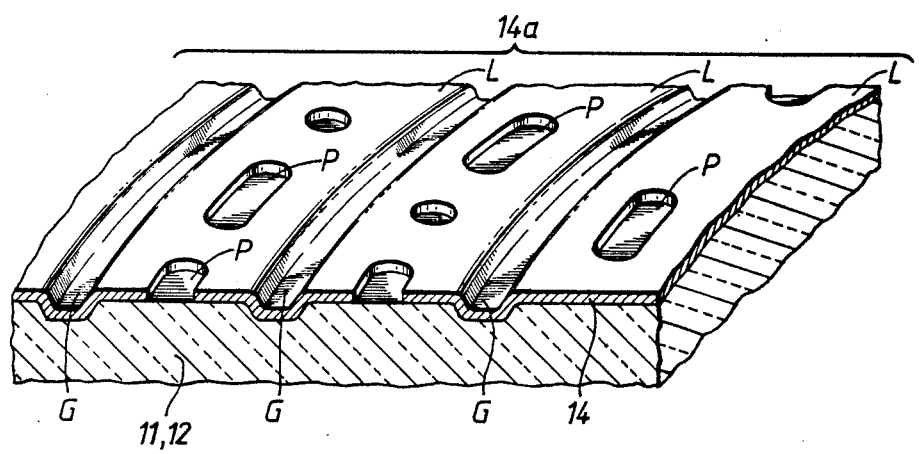
FIG. 4 is a perspective view sectionally showing the pre-formatted data recording portion of the information recording medium of the present invention.

Annular information recording layers 14 are formed by vapor-depositing a metal such as Te (tellurium) on the surfaces of first disc 11 and second disc 12 which face each other. As shown in FIG. 4, a plurality of grooves G are spirally or concentrically formed on recording layers 14 along the circumference of discs 11 and 12. A plurality of lands L are formed between grooves G as tracks on which address data and information data are recorded by using a laser beam. On lands L in address recording area 14a, address data comprising a plurality of pits P is respectively recorded as pre-formatted data by using a laser beam. This address data is made up, for example, of the track number and sector number on information recording layer 14 and is pre-formatted by the CAV (Constant Angular Velocity) method. In the case of this CAV method, because the formatting is carried out at a constant angular velocity, the number of sectors per track are the same at the inner perimeter and the outer perimeter of a recording layer 14. Consequently, in an optical disc formatted by the CAV method, as a general rule, the sectors on each track are positioned at the same angles. For this reason, on an optical disc, address recording areas 14a with sectors in which the address data is recorded are aligned and extend from the inner perimeter to the outer perimeter.

The data in recording layers 14 is reorded, for example, by opening pits using a laser beam from a semiconductor laser along lands L. When playing back, the data recorded on optical disc 10 is reproduced by detecting the reflected light or the transmitted light of a laser beam from a semiconductor laser with which recording layer 14 is irradiated.

An annular inner spacer 15 and an annular outer spacer 16, of thickness about 0.5-1 mm, are positioned concentrically between and bonded to first disc 11 and second disc 12 as the first and second spacers. Furthermore, address recording areas 14a are bonded together with connecting spacers 20 between them as third spacers having the same thickness as inner spacer 15 and outer spacer 16. By this means, air-sandwich construction optical disc 10 is formed having several sector-shaped internal air spaces 17 equivalent in thickness to that of the spacers 20 between the surfaces of recording layers 14. In this case, the two ends of connecting spacers 20 are connected to inner spacer 15 and outer spacer 16, and all the spacers are incorporated by bonding them together. By this means, the bonding areas with first and second discs 11 and 12 become larger and the bonding strength increases. At the same time, the disc is designed so that the space between first and second discs 11 and 12 is maintained constant, and it is not deformed by external pressure or bending.

Air-sandwich construction optical disc 10 has a construction in which two optical discs, recorded on one side each, on which address data which is formatted by the CAV method has been recorded by pre-formatting before the completion of optical disc 10, are bonded together, with inner spacer 15, outer spacer 16 and connecting spacers 20 between them. Consequently, reduction of recording area and damage to the data in address recording areas 14a is prevented due to bonding together of recording layers 14 with connecting spacers 20 between them.

Figure 1:
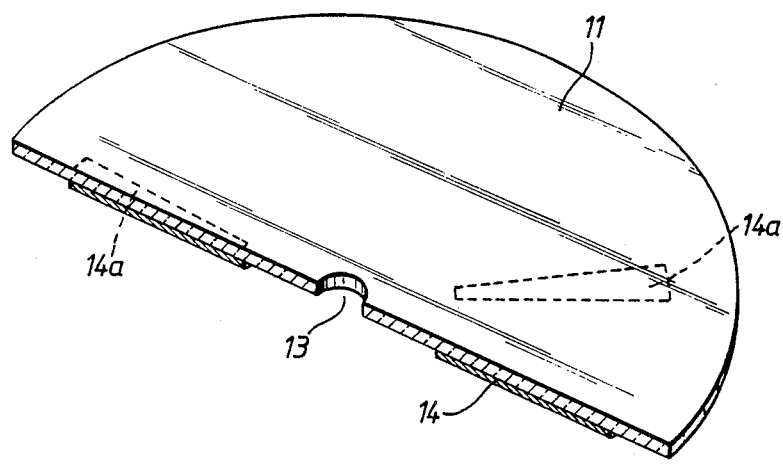
FIG. 1 is a fragmentary perspective view of the information recording medium of the present invention in disassembled form.
Figure 1:
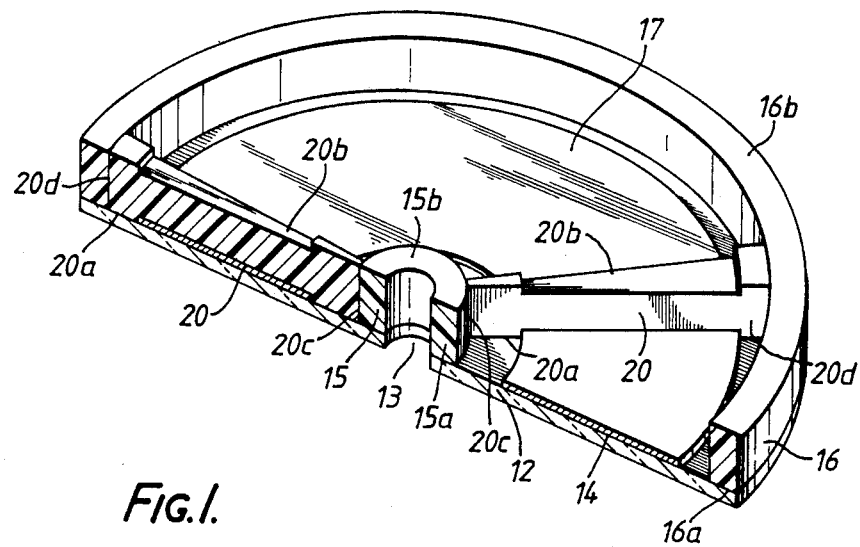

Next, the assembling method of the optical disc in the above construction is described. In FIG. 1, second disc 12 is placed with information recording layer 14 on one side. Then, one side 15a of inner spacer 15 is bonded around spindle hole 18, and one side 16a of outer spacer 16 is bonded around the outer perimeter of second disc 12. In addition, one sides 20a of each of connecting spacers 20 and address recording areas 14a of information recording layer 14 are aligned and bonded together. At this time, one end portion 20c and the other end portion 20d of each spacers 20 are joined to inner spacer 15 and outer spacer 16, respectively. Further, it prefers to bond the joint portions with bonding agent. Address data are recorded previously on address recording area 14a of recording layer 14 by using laser beam, as shown in FIG. 4.

Then, information recording layer 14 of first disc 11 is positioned facing disc 12. Inner spacer 15 is aligned around spindle hole 13 and outer spacer 16 is aligned with the outer perimeter. Moreover, address recording areas 14a are aligned with connecting spacers 20. Then disc 11 is bonded to the exposed surfaces 15b, 16b and 20b of the respective spacers 15, 16 and 20. As a result, first disc 11 and second disc 12 are bonded together with inner spacer 15, outer spacer 16 and connecting spacers 20 in between, and air-sandwich construction optical disc 10 is obtained having sector-shaped internal air spaces 17 equivalent in thickness to those of inner spacer 15, outer spacer 16 and connecting spacers 20.

In the above way, the first and second discs are bonded together with the connecting spacers which connect the inner spacer and the outer spacer at the address recording areas. That is, the design is such that the first and second discs are bonded together, using spacers which are an inner spacer and an outer spacer connected by radially positioned connecting spacers. By this means, the bonding strength for the air-sandwich construction optical disc can be improved by enlarging the bonding area, and peeling of the discs can be prevented. Moreover, the disc is resistant to deformation such as bending, and can prevent damage to the recording layers caused by mutual contact between recording surfaces due to external pressure.

Furthermore, since the surface of the address recording areas and the surface of the connecting spacers are tightly bonded to each other with the bonding agent, the formation of pits is prevented by the bonding agent. Thus, the address data can be protected, that is, damage to the address data and loss of data can be prevented.

Although, in the above embodiment, the inner spacer, the outer spacer and the connecting spacers are all formed separately, bonding may also be carried out using spacers which are formed as a single spacer.

Figure 5:
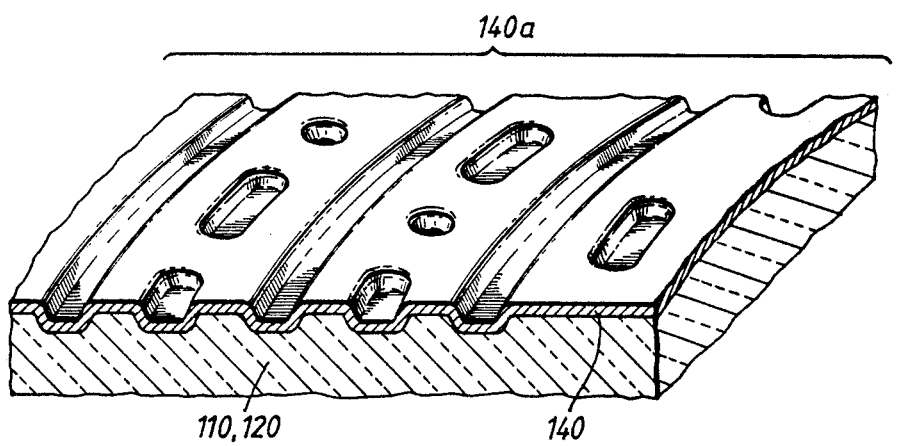
FIG. 5 is a perspective view sectionally showing the pre-formatted data recording portion of an other type of information recording medium of the present invention.

Moreover, the bonding together of first and second discs 110 and 120, which have been formatted as address recording areas 140a as shown in FIG. 5, may be carried out. That is, information recording layers 140 are coated on the discs 110 and 120 after the formation of a plurality of pits on the surface of the discs 110 and 120 to obtain pre-formatted data as address data.

Further, although address data are recorded on lands L in address recording areas 14a as shown in FIG. 4 address data also may be reorded on grooves G.

Furthermore, although polycarbonate resin is preferably used for the discs, such synthetic resins as, for instance, polymethylmethacrylate or epoxy may also be used.

Also, needless to say, the present invention can be applied as an optical disc for recording on one side only by providing an information recording layer on either the first disc or the second disc only and bonding it using the address recording areas of this information recording layer.

As described above, it is possible to provide an information recording medium with improves bonding strength and resistance to deformation, and thus durability can be improved.

What is claimed is:

1. An information recording medium comprising:
   a first disc member having opposite side surfaces;
   a second discs member having opposite side surfaces one of said surfaces of said second disc member opposing one of said surfaces of said first disc member, said second disc member being coaxially positioned adjacent said first disc members;
   a first spacing member provided between said first and second disc members for fixedly connecting said disc members together and defining an air space between said disc members;
   a recording layer disposed on a surface of one of said first and second disc members between said discs members, said recording layer including pre-formatted data recording areas having recorded pre-formatted data thereon; and
   a second spacing member aligned with said pre-formatted data recording areas for bonding said pre-formatted data recording areas to a surface of the opposing other of said first and second disc members to prevent the formation of undesirable data on said pre-formatted data recording areas, wherein said second spacing member includes a plurality of radially extending portions, each of said portions disposed to align with each of said pre-formatted data recording areas.

2. The information recording medium of claim 1 wherein the first spacing member includes an annular inner spacer and an annular outer spacer bonded between the first and second disc members.

3. The information recording medium of claim 2 also including means for bonding the second spacing member to the inner spacer and the outer spacer.

4. The information recording medium of claim 1 wherein the pre-formatted data recording areas includes a metal layer having portions extending radially at a predetermined angle on said recording layer.

5. An information recording medium comprising:
   a first disc member;
   a second disc member coaxially positioned adjacent said first disc member;
   a first spacing member disposed between said first and second disc members for fixedly connecting said disc members together and defining an air space between said disc members;
   a recording layer disposed on a surface of each of said first and second disc members between said discs members, each of said recording layers including pre-formatted data recording areas having recorded pre-formatted data thereon; and
   a second spacing member aligned with each of said pre-formatted data recording areas for bonding the pre-formatted data recording areas of said first and second disc members together to prevent the formation of undesirable data on said pre-formatted data recording areas, wherein said second spacing member includes a plurality of radially extending portions, each of said portions disposed to align with each of said pre-formatted data recording areas.

6. The information recording medium of claim 5 wherein said first spacing member includes an annular inner spacer and an annular outer spacer bonded between said first and second disc members.

7. The information recording medium of claim 6 also including means for bonding said second spacing member to the inner spacer and said outer spacer.

8. The information recording medium of claim 5 wherein said pre-formatted data recording areas includes a metal layer extending radially on the disc of said recording layer defined by a predetermined angle.

9. An information recording medium comprising:
   a first disc member having opposite surfaces;
   a second disc member having opposite surfaces, one of said surfaces of said second disc member opposing one of said surfaces of said first disc member, said second disc member being coaxially positioned adjacent to said first disc member;
   at least one recording layer disposed on a surface of at least one of said first and second disc members between said disc members, said recording layer including a plurality of pre-formatted data recording areas having recorded pre-formatted data thereon; and
   spacing means disposed between said first and second disc members for fixedly connecting said disc members together and defining an air space between said disc members, said spacing means having portions aligned with the surface of said pre-formatted data recording areas for bonding said pre-formatted data recording areas to a surface of the opposing other of said first and second disc members to protect said pre-formatted recording areas, wherein said spacing means includes a plurality of radially extending portions, each of said portions disposed to align with each of said pre-formatted data recording areas.

10. An information recording medium as set forth in claim 9 wherein said spacing means includes annular spacing members disposed between said first and second disc members to define said air space.

* * * * *

UNITED STATES PATENT AND TRADEMARK OFFICE
CERTIFICATE OF CORRECTION

PATENT NO. : 4,969,143
DATED : November 06, 1990
INVENTOR(S) : NOBORU OGINO

It is certified that error appears in the above-identified patent and that said Letters Patent is hereby corrected as shown below:

Claim 1, column 5, line 14, change "discs" to --disc--.

Claim 1, column 5, line 18, change "members" to --member--.

Claim 1, column 5, line 24, change "discs" to --disc--.

Claim 4, column 5, lines 47,48 change "includes" to --include--.

Claim 5, column 6, line 2, change "discs" to --disc--.

Claim 7, column 6, line 22, change "the" to --said--.

Claim 8, column 6, lines, 24,25 change "includes" to --include--.

Claim 8, column 6, line 25, after "disc" insert --on an area--.

UNITED STATES PATENT AND TRADEMARK OFFICE
CERTIFICATE OF CORRECTION

PATENT NO. : 4,969,143

DATED : November 6, 1990

INVENTOR(S) : Noboru Ogino

It is certified that error appears in the above-identified patent and that said Letters Patent is hereby corrected as shown below:

Claim 9, column 6, line 48, before "recording" insert --data--.

Signed and Sealed this

Twenty-seventh Day of April, 1993

*Attest:*

MICHAEL K. KIRK

*Attesting Officer*    Acting Commissioner of Patents and Trademarks